United States Patent
Haas et al.

(10) Patent No.: US 11,128,028 B2
(45) Date of Patent: Sep. 21, 2021

(54) FILL LEVEL RADAR COMPRISING A BUILD-UP DETECTOR

(71) Applicant: VEGA Grieshaber KG, Wolfach (DE)

(72) Inventors: Juergen Haas, Oberwolfach (DE);
Stefan Kaspar, Hofstetten (DE);
Matthias Schmidt, Schonach (DE)

(73) Assignee: VEGA Grieshaber KG, Wolfach (DE)

( * ) Notice: Subject to any disclaimer, the term of this patent is extended or adjusted under 35 U.S.C. 154(b) by 310 days.

(21) Appl. No.: 16/273,840

(22) Filed: Feb. 12, 2019

(65) Prior Publication Data
US 2019/0252760 A1    Aug. 15, 2019

(30) Foreign Application Priority Data
Feb. 14, 2018  (EP) .................................... 18156673

(51) Int. Cl.
*H01Q 1/22* (2006.01)
*G01S 13/88* (2006.01)
*G01F 23/284* (2006.01)
*G01S 13/02* (2006.01)

(52) U.S. Cl.
CPC ........... *H01Q 1/225* (2013.01); *G01F 23/284* (2013.01); *G01S 13/88* (2013.01); *G01S 13/02* (2013.01)

(58) Field of Classification Search
CPC ...... G01F 23/284; G01S 13/88; G01S 13/885; G01S 13/02; H01Q 1/225
See application file for complete search history.

(56) References Cited

U.S. PATENT DOCUMENTS

| | | | |
|---|---|---|---|
| 5,370,776 A * | 12/1994 | Chen ..................... | G01N 17/02 204/404 |
| 6,433,560 B1 * | 8/2002 | Hansen ................. | G01F 23/265 324/441 |
| 6,844,745 B1 * | 1/2005 | Schachameyer ... | G01N 33/2888 324/691 |
| 6,850,865 B2 * | 2/2005 | Hirthe ................... | F16H 57/04 324/439 |
| 7,043,372 B2 * | 5/2006 | Koehler ............... | G01N 27/026 324/693 |
| 7,049,831 B2 * | 5/2006 | Wooton ............. | G01N 33/2888 324/698 |
| 7,078,910 B2 * | 7/2006 | Hirthe ................. | G01N 33/2888 324/446 |
| 7,106,075 B2 * | 9/2006 | Hu ...................... | G01N 33/2858 324/698 |

(Continued)

FOREIGN PATENT DOCUMENTS

DE    10 2014 114 963 A1    4/2016
EP        2 811 269 A1      12/2014
(Continued)

*Primary Examiner* — Peter M Bythrow
(74) *Attorney, Agent, or Firm* — Oblon, McClelland, Maier & Neustadt, L.L.P.

(57) ABSTRACT

A fill level radar for continuously measuring a fill level is provided, including a radar arrangement configured to generate and to emit a radar signal toward a surface of a filling material; and an impedance spectroscopy arrangement configured to detect a build-up of deposits on the radar arrangement, or to detect a gas phase of the filling material, by impedance spectroscopy, the impedance spectroscopy arrangement being integrated in the radar arrangement.

11 Claims, 5 Drawing Sheets

(56) References Cited

U.S. PATENT DOCUMENTS

| | | | |
|---|---|---|---|
| 7,621,181 B2* | 11/2009 | Cammarata | G01F 23/24 |
| | | | 73/290 R |
| 7,983,864 B2* | 7/2011 | Hu | G01N 33/2823 |
| | | | 702/65 |
| 8,601,867 B2* | 12/2013 | Prinstil | G01F 23/76 |
| | | | 73/311 |
| 10,598,650 B2* | 3/2020 | Worden | G01N 33/2888 |
| 2003/0222656 A1* | 12/2003 | Phillips | G01N 33/2888 |
| | | | 324/605 |
| 2004/0239344 A1* | 12/2004 | Hu | G01N 33/2858 |
| | | | 324/698 |
| 2005/0274611 A1* | 12/2005 | Schlichting | G01N 17/02 |
| | | | 204/401 |
| 2006/0015292 A1* | 1/2006 | Lubcke | G01F 25/0061 |
| | | | 702/183 |
| 2007/0163892 A1* | 7/2007 | Haridas | G01N 17/04 |
| | | | 205/776.5 |
| 2007/0240505 A1* | 10/2007 | Cammarata | G01F 23/24 |
| | | | 73/304 R |
| 2009/0273506 A1* | 11/2009 | Delin | G01F 23/284 |
| | | | 342/124 |
| 2013/0096853 A1* | 4/2013 | Mahalingam | G01R 31/3274 |
| | | | 702/58 |
| 2013/0307564 A1* | 11/2013 | Colosimo | G01N 27/221 |
| | | | 324/647 |
| 2014/0208950 A1* | 7/2014 | Giurgiutiu | G01N 29/2437 |
| | | | 96/153 |
| 2015/0064723 A1* | 3/2015 | Mutharasan | G01N 27/02 |
| | | | 435/7.23 |
| 2015/0097715 A1* | 4/2015 | Schultheiss | G01S 7/354 |
| | | | 342/124 |
| 2015/0167439 A1* | 6/2015 | Kasevich | E21B 43/168 |
| | | | 166/248 |
| 2015/0270584 A1* | 9/2015 | Saunders | H01M 10/48 |
| | | | 324/426 |
| 2016/0098500 A1* | 4/2016 | Haran | G01S 7/40 |
| | | | 703/2 |
| 2016/0123787 A1 | 5/2016 | Burgert et al. | |
| 2016/0146658 A1 | 5/2016 | Littleford | |
| 2016/0161624 A1* | 6/2016 | Pluta | G01V 3/12 |
| | | | 324/327 |
| 2016/0223381 A1* | 8/2016 | Weinzierle | G01F 25/0061 |
| 2016/0282168 A1 | 9/2016 | Fehrenbach et al. | |
| 2016/0298994 A1 | 10/2016 | Dieterle | |
| 2016/0341029 A1* | 11/2016 | Phillips | E21B 47/06 |
| 2017/0045492 A1 | 2/2017 | Surman et al. | |
| 2017/0248690 A1* | 8/2017 | Backstrom | G01F 23/284 |
| 2018/0145392 A1* | 5/2018 | Heath | G01S 13/88 |
| 2019/0101520 A1* | 4/2019 | Henneberg | F01M 11/10 |

FOREIGN PATENT DOCUMENTS

| | | |
|---|---|---|
| EP | 3 073 229 A1 | 9/2016 |
| EP | 3 078 943 A1 | 10/2016 |

* cited by examiner

FILL LEVEL RADAR COMPRISING A BUILD-UP DETECTOR

CROSS-REFERENCE TO RELATED APPLICATION

This application claims the benefit of the filing date of European Patent Application No. 18 156 673.8, filed on 14 Feb. 2018, the disclosure of which is incorporated herein by reference.

FIELD

The invention relates to fill level measurement technology. The invention relates in particular to a fill level radar for continuously measuring a fill level, to a method for continuously measuring a fill level, to a program element, and to a computer-readable medium.

BACKGROUND

The fill level can be continuously measured using a fill level radar, which generates a radar signal and either emits it toward the filling material surface as a free jet or comprises an elongate probe, for example in the shape of a rod, cable, or pipe, along which or in which the radar signal is conducted toward the fill level surface.

In the latter case, the probe is typically immersed in the filling material such that an impedance jump occurs at the interface between the filling material and the container atmosphere, which jump can be detected in the reflected signal by the electronic evaluation system of the fill level radar. For the free-jet fill level radar, an antenna is provided that emits the radar signal toward the filling material surface.

Contamination on the antenna or the probe can lead to the measurement signal being distorted and an incorrect fill level possibly being output.

SUMMARY

A first aspect relates to a fill level radar for continuously measuring a fill level, i.e., in particular a free-jet fill level radar or a fill level radar that uses guided radar signals. The fill level radar comprises a radar arrangement, which is designed to generate and to emit a radar signal toward the filling material surface.

An impedance spectroscopy arrangement is also provided, which is used to detect a build-up of deposits on the radar arrangement, in particular on the probe (in the case of a guided radar signal) or the antenna (in the case of a free-jet radar device).

The impedance spectroscopy arrangement can also be designed to detect a gas phase of the filling material by means of impedance spectroscopy.

The impedance spectroscopy arrangement is integrated in the radar arrangement. The probe of the impedance spectroscopy arrangement is typically installed in or on the radar arrangement where contamination may occur and may interfere with said radar arrangement.

The fill level radar can also comprise a plurality of impedance spectroscopy arrangements of this type, for example if there are a plurality of points at which contamination caused by the filling material can adversely affect the measurement result.

The impedance spectroscopy arrangement can reliably detect a build-up of deposits. In particular, the arrangement is able to decide whether this is a build-up of deposits or a "full" state, therefore whether the corresponding point of the antenna/probe, at which the impedance spectroscopy arrangement is installed, is covered by the filling material or has merely been contaminated by the filling material.

The impedance spectroscopy arrangement can also be designed to decide whether there is a vapour atmosphere that emanates from the filling material, or whether only "normal" air is above the filling material surface.

The impedance spectroscopy arrangement can determine the AC resistance in the area around the arrangement. This AC resistance, also known as impedance, is measured on the basis of the frequency of the AC current applied. For this purpose, the impedance is determined at a plurality of frequencies over a defined frequency range (spectrum). The "impedance peak" or the dependency of the impedance on the frequency changes when the medium in which the impedance spectroscopy arrangement is arranged changes. If the antenna/the probe is immersed in the filling material, the impedance curve has a different shape and typically a shifted impedance peak compared with when the antenna/ the probe is not surrounded by a filling material. The situation is similar in the event of a build-up of deposits.

According to one embodiment, the radar arrangement comprises a probe in the form of a rod, rope, or a pipe, which is designed to guide the radar signal toward the surface of the filling material.

According to another embodiment, the impedance spectroscopy arrangement comprises a sensor that is integrated in a seal of the probe.

By integrating the sensor in a conical seal of the probe, for example, the sensor can be effectively protected from the container atmosphere. The conical seal is made of insulating material such as PEEK, PPS, PTFE, or ceramic, for example.

According to another embodiment, the sensor is annular.

According to another embodiment, the fill level radar comprises an antenna, which is designed to emit the radar signal toward the surface of the filling material. In this case, the sensor can be integrated in the antenna.

In particular, said sensor can be strip-shaped or cross-shaped.

In particular, the antenna can be designed to emit the radar signal such that it is polarised, the polarisation plane of the radar signal being at an angle with respect to the sensor that is not 0 degrees, i.e., is not oriented in parallel with the strip or with a leg of the cross, but obliquely thereto such that said radar signal can pass the sensor as unobstructed as possible or in a manner only slightly obstructed.

According to another embodiment, the fill level radar comprises an electronic evaluation system, which is designed to evaluate the radar signal reflected by the filling material surface in order to calculate the fill level therefrom, and to evaluate the measurement carried out by the impedance spectroscopy arrangement (i.e., the impedance spectroscopy) in order to establish whether there is a build-up of deposits on the radar arrangement.

In particular, the fill level radar or the electronic evaluation system can be designed to identify a build-up of deposits in the coupling-in region of the probe by means of impedance spectroscopy.

The evaluation apparatus can also be designed to correct the measured value of the fill level detected by the fill level radar if a build-up of deposits or a vapour atmosphere is detected. This can improve the measurement result.

Another aspect relates to a method for continuously measuring a fill level, in which a build-up of deposits on a radar arrangement of a fill level radar is detected by means of impedance spectroscopy.

Another aspect relates to a program element that, when executed on an electronic evaluation system of a fill level radar, instructs the electronic evaluation system to detect a build-up of deposits on a radar arrangement of a fill level radar by means of impedance spectroscopy.

Another aspect relates to a computer-readable medium, on which the above-described program element is stored.

BRIEF DESCRIPTION OF THE FIGURES

Embodiments of the invention will be described in the following with reference to the figures. The views in the figures are schematic and are not to scale. If the same reference numerals are used in the following description of the figures, these describe the same or similar elements.

DETAILED DESCRIPTION OF EMBODIMENTS

Figure 1:
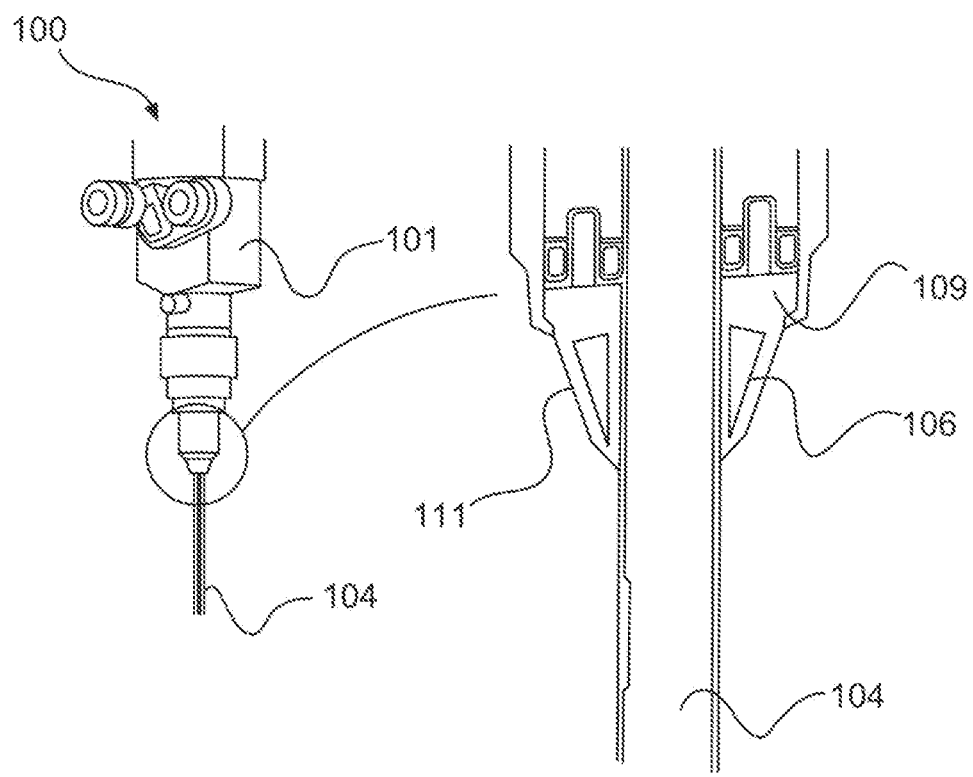
FIG. 1 shows a fill level radar according to an embodiment.

FIG. 1 shows a fill level radar 100, comprising a radar arrangement 101, which comprises a probe in the form of a rod 104, and an impedance spectroscopy arrangement comprising a sensor 106. An insulating conical seal, in which the sensor 106 is integrated, is arranged at the coupling-in point (coupling-in region) 111 of the probe 104 such that it is protected from the container atmosphere. The sensor 106 is, for example, arranged around the probe 104 in the form of a ring and is used to perform impedance spectroscopy.

Figure 2:
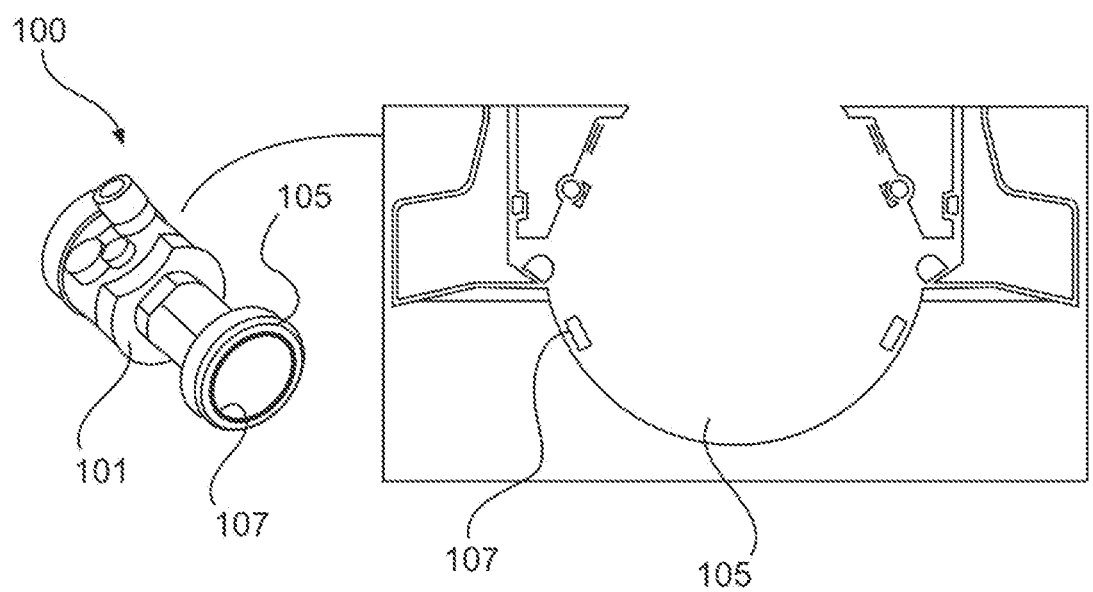
FIG. 2 shows a fill level radar according to another embodiment.

FIG. 2 shows another embodiment of a fill level radar 100, this time in the form of a free jet radar device comprising an antenna 105, which comprises a piece of insulation, for example in the form of a PTFE lens, in which the sensor 107 of the impedance spectroscopy arrangement is integrated.

Also in FIG. 2, the sensor can be annular, comprising a surface that is arranged in parallel with the surface of the antenna cover or lens, for example. At least one thin layer of the lens or antenna cover material is arranged between the sensor 107 and the container atmosphere or the filling material such that the sensor is electrically insulated from the container atmosphere.

Figure 3:
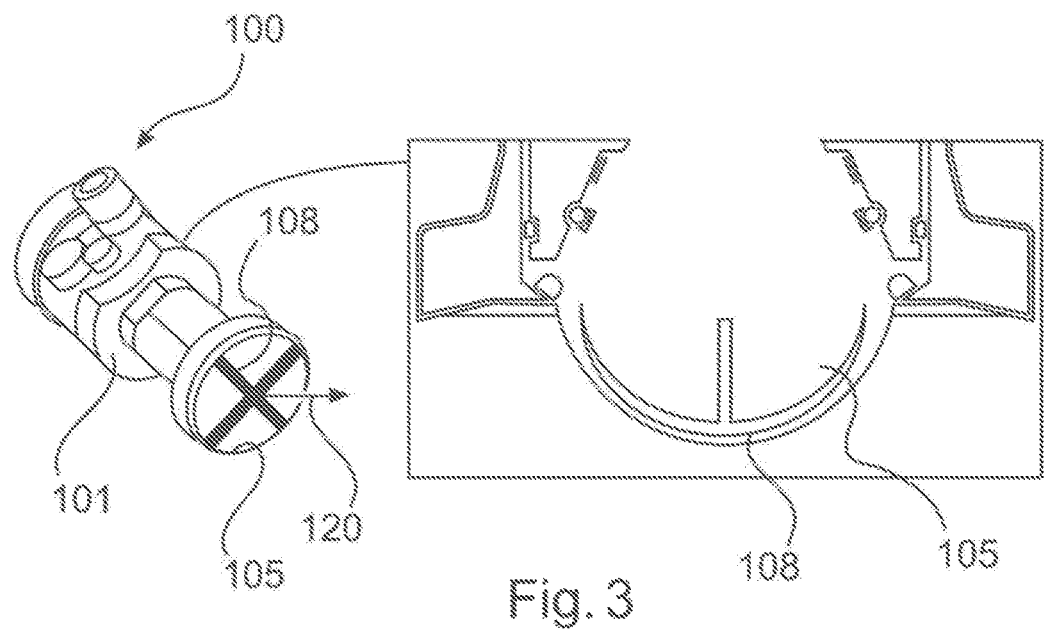
FIG. 3 shows a fill level radar according to another embodiment.

FIG. 3 shows another embodiment of a fill level radar 100, which, like that shown in FIG. 2, is in the form of a free-jet radar device, but in which the sensor 108 is cross-shaped. The left-hand region of FIG. 3 is a plan view of the antenna, in which the cross-shaped embodiment can be identified. The polarisation plane of the radar signal emitted is shown by the arrow 120.

The right-hand region of FIG. 3 is a sectional view through the antenna 105. It is clear here that the sensor 108 substantially imitates the shape of the antenna cover or lens, but is arranged inside the lens so as to be insulated by the lens material in the direction of the container atmosphere.

By integrating the impedance spectroscopy arrangement in the fill level radar, it is possible to ensure that overfilling is reliably identified. It is also possible to identify a build-up of deposits in the coupling-in region of the probe/the antenna, and it may possible to switch the fill level radar between the applications of "separating layer comprising an overlying gas phase" and "separating layer devoid of an overlying gas phase." "Separating layer comprising an overlying gas phase" means that there is a (filling material) vapour atmosphere above the liquid filling material. "Separating layer devoid of an overlying gas phase" means that there is not a vapour atmosphere above the filling material, but a lighter medium, for example, oil.

By means of the fill level radar comprising the integrated impedance spectroscopy arrangement, the method of continuously measuring a fill level can be improved, for both the guided and the free-jet radar device, in order to ultimately increase the system availability and the measurement reliability.

In particular, a build-up of deposits in the coupling-in region can be reliably identified. This finding can be used to adapt the sensitivity in the vicinity of the antenna and/or to update an interference signal fade-out in order to avoid measured value jumps.

It is also possible to use the finding of a build-up of deposits to carry out anticipatory maintenance of the radar, and the customer can be given information in good time concerning the fact that the measurement could be influenced.

The situations detected by the impedance spectroscopy arrangement (probe comprising a build-up of deposits/vapour atmosphere in the container/probe not comprising a build-up of deposits but covered by the filling material) can also be used to correct the measured value.

In the case of a vapour atmosphere, an operational life correction can be performed, for example. This is also possible in the case of a build-up of deposits, since the operational life may be dependent on the thickness of the layer of build-up.

Impedance spectroscopy can ensure that overfilling is reliably identified for all media, irrespective of the Dl value of the filling material or of the atmosphere in the container and irrespective of whether the filling material is a liquid or a bulk material. Additional mechanical components are not required in the process, since the impedance spectroscopy arrangement is integrated in the fill level radar. Ultimately, this is also a redundant method for identifying overfilling.

By combining the fill level measurement with the impedance spectroscopy measurement, the measured values from the impedance spectroscopy can be used to optimise the fill level measurement and, by means of the redundant structure (i.e., the use of two measurement principles (radar signal/impedance spectroscopy)), an additional possibility is provided for identifying an overfilling situation.

Figure 4:
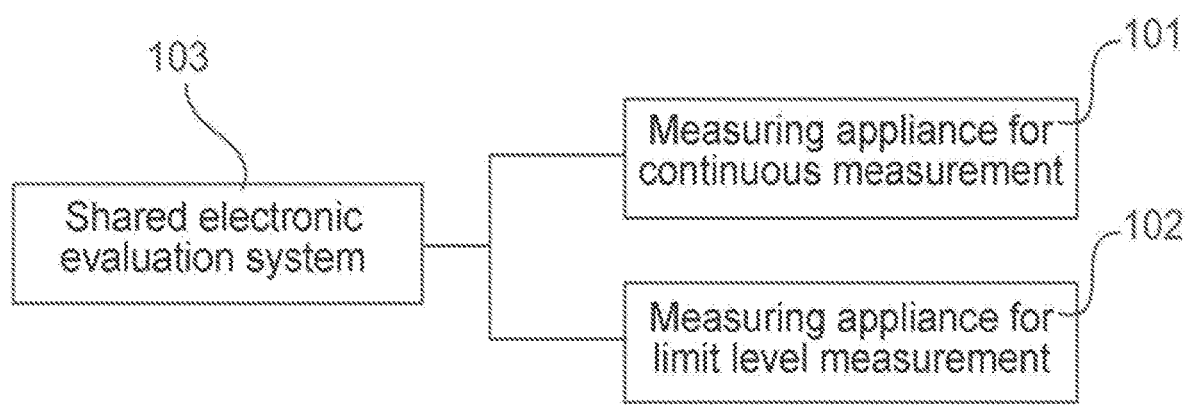
FIG. 4 is a schematic view of the structure of a fill level radar according to an embodiment.

FIG. 4 is a schematic view of a fill level radar 100 according to an embodiment. A shared electronic evaluation system 103 is provided, which is assigned to both the radar arrangement 101 and the impedance spectroscopy arrangement 102 and processes both measured values. The control of and signal generation for both the radar arrangement and the impedance spectroscopy arrangement can be arranged in this common electronic evaluation system.

By switching the frequency of the measured signals generated, both measuring appliances can be formed by the same electronic evaluation system (hardware).

Figure 5:
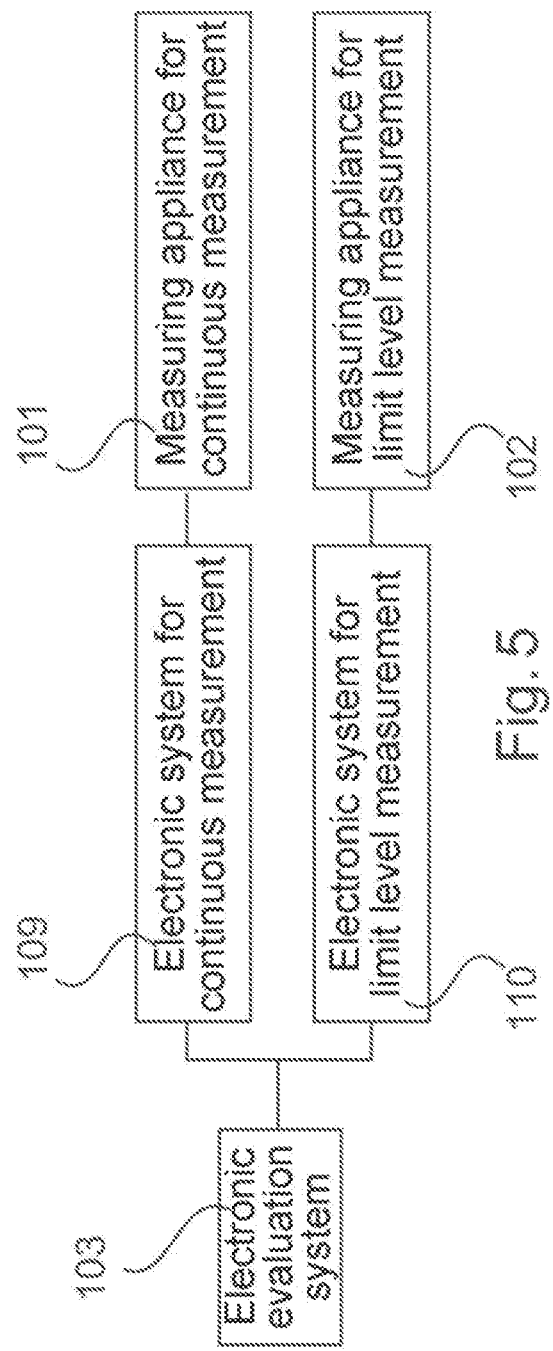
FIG. 5 is a schematic view of the structure of a fill level radar according to another embodiment.

FIG. 5 shows another example of a fill level radar 100, in which both measuring appliance 109, 110 have a separate structure in order to form a redundant structure. However, the measured values are evaluated by a common electronic evaluation system 103 in this case, too.

Figure 6:
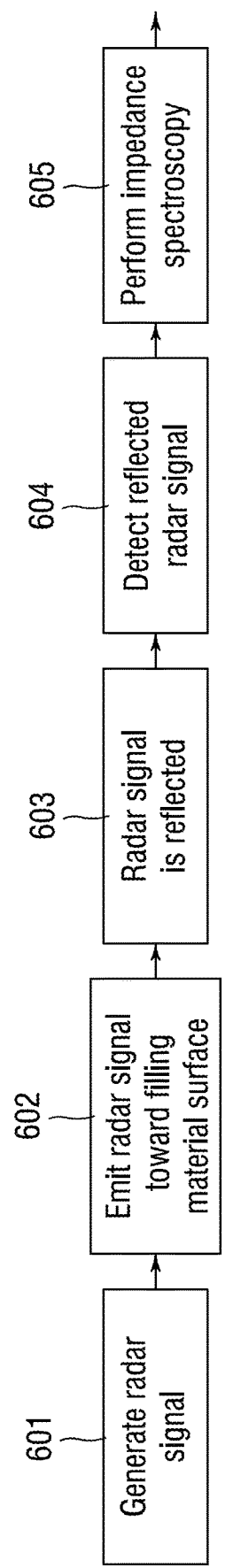
FIG. 6 is a flow diagram of a method according to an embodiment.

FIG. 6 shows a flow diagram of a method according to an embodiment. In step 601, a radar signal is generated by an electronic system of a continuous fill level radar device. In step 602, said radar signal is emitted toward the filling material surface. In step 603, it is reflected at said surface. And, in step 604, it is detected by the electronic system once again. In step 605, impedance spectroscopy is carried out in order to verify the accuracy of the measured value obtained by means of impedance spectroscopy and to correct it if necessary or to establish whether a build-up of deposits/contamination has occurred on the measuring probe or the antenna, or whether the measuring probe/antenna is covered by the filling material at the coupling-in point or has been immersed in the filling material.

A vapour atmosphere can also be detected. If a vapour atmosphere or contamination is detected, the measured value for the fill level measurement can be corrected accordingly.

Figure 7:
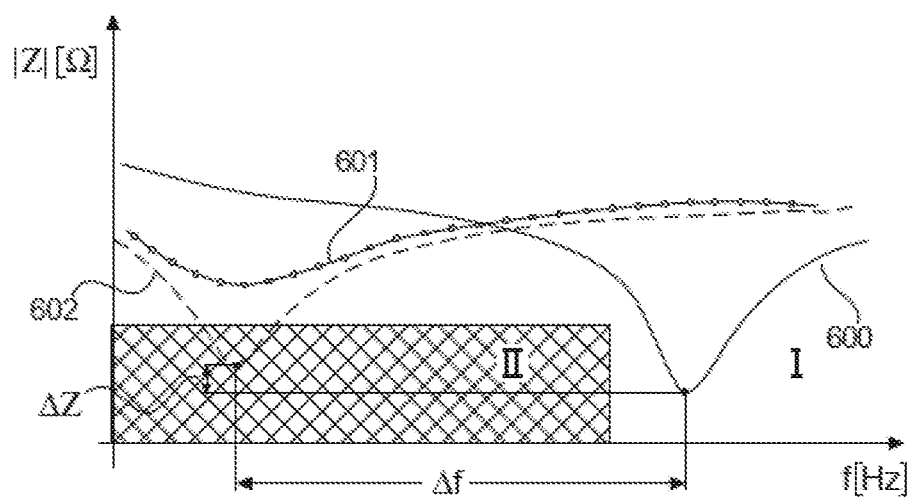
FIG. 7 shows three impedance measurement curves for a fill level radar according to another embodiment.

FIG. 7 shows, by way of example, the impedance behaviour of the impedance spectroscopy arrangement for a medium of ketchup. In this figure, the impedance (Z) is shown as a function of the frequency (f). The curve 600 describes the resonance behaviour of a clean measuring probe. Curve 601 shows the behaviour of a measuring probe contaminated with ketchup. If the measuring probe is completely covered by ketchup, the resonance behaviour of curve 602 occurs. In this case, the minima of the two measurement curves 602 and 600 differ by Δf in terms of frequency, as shown in FIG. 7. The impedance of the two minima of the measurement curves 602 and 600 differ by ΔZ. If the minimum of the resonance curve is within region I, the evaluation and control unit outputs the switching command "empty". However, if the minimum is in region II, the "full state" is detected and output. The two defined switching regions can be hardcoded in the sensor ex-works or can be set and changed by means of a customer adjustment. Ideally, the regions should be defined such that, for as many different media as possible, this standard setting is sufficient since an adjustment made by the customer is not desirable (time-consuming). In principle, for each measurement, the entire frequency range is always passed through and analysed during evaluation.

Figure 8:
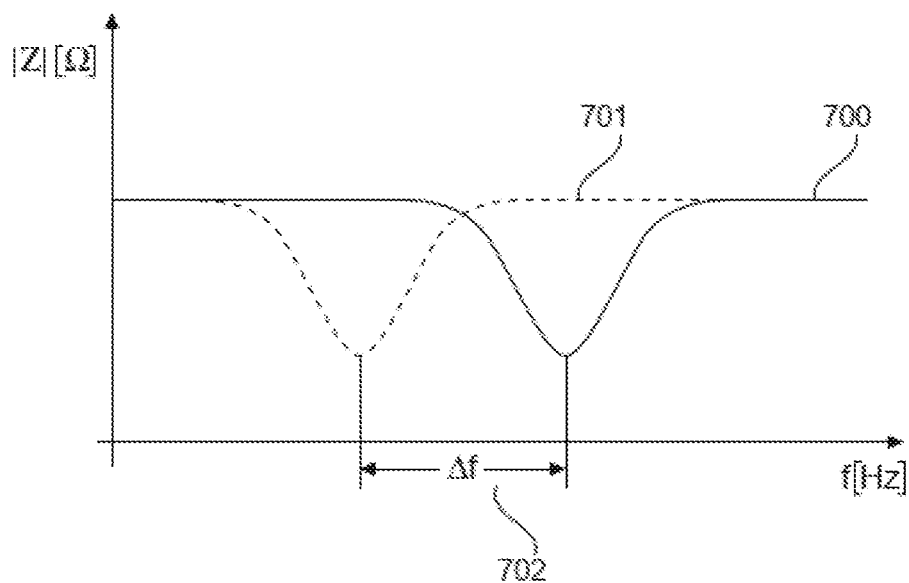
FIG. 8 shows two impedance measurement curves for a fill level radar according to an embodiment.

By way of example, FIG. 8 describes the behaviour when an overlying atmosphere, for example vapour, is present. Curve 700 shows the resonance behaviour when an overlying atmosphere is not present, curve 701 shows said behaviour when an atmosphere is present. Similarly to FIG. 7, FIG. 8 shows the impedance (Z) as a function of the frequency (f). By means of the superposed atmosphere, the position of the resonance point shifts by an amount of the frequency 702 depending on the Dk value. For vapour, the Dk value is mainly determined by the factors "pressure" and "temperature", there being a solid connection between the two.

The invention claimed is:

1. A fill level radar for continuously measuring a fill level, comprising:
    a radar arrangement configured to generate and to emit a radar signal toward a surface of a filling material; and
    an impedance spectroscopy arrangement configured to detect a build-up of deposits on the radar arrangement, or to detect a gas phase of the filling material, by impedance spectroscopy,
    wherein the impedance spectroscopy arrangement is integrated in the radar arrangement.

2. The fill level radar according to claim 1,
    wherein the radar arrangement comprises a probe configured to guide the emitted radar signal to the surface of the filling material.

3. The fill level radar according to claim 2,
    wherein the impedance spectroscopy arrangement comprises a sensor that is integrated in a seal of the probe.

4. The fill level radar according to claim 1,
    wherein the radar arrangement comprises an antenna configured to emit the radar signal toward the surface of the filling material.

5. The fill level radar according to claim 4,
    wherein the impedance spectroscopy arrangement comprises a sensor that is integrated in the antenna.

6. The fill level radar according to claim 3,
    wherein the sensor is annular.

7. The fill level radar according to claim 5,
    wherein the sensor is annular.

8. The fill level radar according to claim 5,
    wherein the sensor is strip-shaped or cross-shaped.

9. The fill level radar according to claim 4,
    wherein the antenna is configured to emit the radar signal such that the emitted radar signal is polarised, and
    wherein a polarisation plane of the emitted radar signal is at an angle with respect to a sensor that is integrated in the antenna.

10. The fill level radar according to claim 1, further comprising an electronic evaluation system configured to evaluate a radar signal reflected by the surface of the filling material in order to calculate the fill level therefrom, and to evaluate a measurement carried out by the impedance spectroscopy arrangement in order to establish whether there is the build-up of deposits on the radar arrangement.

11. The fill level radar according to claim 10,
    wherein the electronic evaluation system is further configured to identify the build-up of deposits in a coupling-in region of a probe, by impedance spectroscopy.

* * * * *